United States Patent
Surazski et al.

(10) Patent No.: US 7,130,281 B1
(45) Date of Patent: Oct. 31, 2006

(54) DEVICES, SOFTWARES AND METHODS WITH IMPROVED PERFORMANCE OF ACOUSTIC ECHO CANCELER IN VOIP COMMUNICATION

(75) Inventors: Luke Surazski, Santa Clara, CA (US); Pascal Huart, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 957 days.

(21) Appl. No.: 09/823,495

(22) Filed: Mar. 30, 2001

(51) Int. Cl.
*H04B 3/20* (2006.01)
(52) U.S. Cl. ...................................... 370/289
(58) Field of Classification Search ........ 370/259–271, 370/351–356, 286, 289; 379/3, 406.01–406.16
See application file for complete search history.

(56) References Cited

U.S. PATENT DOCUMENTS

| | | | |
|---|---|---|---|
| 5,689,556 A * | 11/1997 | Gupta et al. ........... | 379/406.06 |
| 6,304,655 B1 * | 10/2001 | Meek ..................... | 379/406.01 |
| 6,404,887 B1 * | 6/2002 | Born et al. ............ | 379/406.04 |
| 6,700,979 B1 * | 3/2004 | Washiya ................ | 379/406.09 |
| 6,724,736 B1 * | 4/2004 | Azriel ........................ | 370/286 |
| 6,735,303 B1 * | 5/2004 | Okuda .................. | 379/406.04 |
| 2002/0064168 A1 * | 5/2002 | Garakani et al. .......... | 370/410 |

* cited by examiner

*Primary Examiner*—Steven Nguyen
*Assistant Examiner*—Jason Mattis
(74) *Attorney, Agent, or Firm*—Marger Johnson & McCollom, P.C.

(57) ABSTRACT

Devices, softwares and methods send a warning signal when a periodic signal is present in the audio content of a VoIP connection. In response to the warning signal, an acoustic echo canceller of an IP telephone discontinues its adapting process. A signaling network switch detects when a periodic signal is present in the audio content, and issues a warning signal. A signaling call manager device, when it transmits a tone that has periodicity, it also transmits a warning signal.

38 Claims, 8 Drawing Sheets

500

| 510 | ESTABLISH FIRST NETWORK CALL MANAGER CONNECTION WITH FIRST DEVICE |

| 520 | ESTABLISH SECOND NETWORK CALL MANAGER CONNECTION WITH SECOND DEVICE |

| 530 | ASSIST FIRST DEVICE TO ESTABLISH A COMMUNICATION CONNECTION WITH THE SECOND DEVICE |

| 540 | GENERATE PERIODIC SIGNAL OR INSTRUCTION FOR ONE |

| 550 | IDENTIFY TYPE OF PERIODIC SIGNAL |

| 560 | DETERMINE TIME DURATION OF THE PERIODIC SIGNAL FROM THE IDENTIFIED TYPE |

| 570 | ENCODE DURATION IN A WARNING SIGNAL |

| 580 | TRANSMIT THE WARNING SIGNAL |

| 590 | TRANSMIT THE GENERATED PERIODIC SIGNAL OR INSTRUCTION |

FIG. 5

DEVICES, SOFTWARES AND METHODS WITH IMPROVED PERFORMANCE OF ACOUSTIC ECHO CANCELER IN VOIP COMMUNICATION

BACKGROUND OF THE INVENTION

1. Field of the Invention

The present invention is related to the field of network telephony, and more specifically to devices, softwares and methods for improving a quality of a telephone call performed via a network.

2. Description of the Related Art

Packet switched networks, such as the internet, are increasingly used for voice communications. These communications are implemented using telephone devices that are connected to special network devices called gateways. The voice data is typically exchanged under a special protocol called Voice over Internet Protocol (VoIP). Sometimes the telephones are IP (Internet Protocol) telephones, and the gateways are voice gateways.

The telephone devices sometimes have an acoustic echo canceller. This feature minimizes how much echo of a voice communication is returned to the other party.

Acoustic echo cancellers typically adapt to the acoustic characteristics of the room. They tend to work intensively during the beginning of a voice communication, and often during it.

A problem with adaptive acoustic echo cancellers occurs during and immediately after call setup, when an acoustic echo canceller works the most intensively. Call progress tones are heard which include DTMF (Dual Tone Multi Frequency) tones, and are given disproportionate weight. Adaptive acoustic echo cancellers adapt particularly well to those, because of their periodicity.

Such adapting generates problems, because later other tones might be canceled out, by being treated as echoes. Such other tones include those, for example, of call waiting. In addition other sounds present during typical call set up (paper shuffling, finger tapping) tend to cause tones to fade in and out, especially in speakerphone applications. Fading in and out tends to be very annoying.

BRIEF SUMMARY OF THE INVENTION

The present invention overcomes these problems and limitations of the prior art.

Generally, the present invention provides devices, softwares and methods with improved performance of acoustic echo canceller in VoIP communication. The invention sends a warning signal when a periodic signal is present in the audio content. The acoustic echo canceller discontinues its adapting process during that time, in response to the warning signal.

A device according to the invention is a signaling network switch, which detects when a periodic signal is present in the audio content. The signaling network switch issues a warning signal for when the periodic signal starts, and optionally also a clear signal when the periodic signal ends.

Another device according to the invention is a signaling call manager device, which regularly assists in setting up a call between two network devices. When it transmits a tone (such as a tone command) that has periodicity, it also transmits a warning signal.

Another device made according to the invention is an IP telephone. The IP telephone includes a codec for packetizing and unpacketizing the audio signal. It also includes a speaker and a microphone. An acoustic echo canceller senses the output of the microphone, and generates a canceling signal to cancel the echo. The acoustic echo canceller is adaptive for better performance. The telephone includes a detector for detecting a warning signal from a cooperating signaling network switch or from a cooperating signaling call manager, and for outputting a disable signal in response to the warning signal. The acoustic echo canceller discontinues adapting responsive to the disable signal.

The invention offers the advantage that processing for detecting periodic tones is performed at the resource rich voice gateway. This way the telephone, having the fewer resources, is unfettered from having to detect a periodic tone.

The invention will become more readily apparent from the following Detailed Description, which proceeds with reference to the drawings, in which:

BRIEF DESCRIPTION OF THE DRAWINGS

FIG. 5 is a flowchart illustrating another method according to an embodiment of the present invention, which may be performed by a signaling network call manager device.

DETAILED DESCRIPTION OF THE PREFERRED EMBODIMENT(S)

As has been mentioned, the present invention provides devices, softwares and methods with improved performance of acoustic echo canceller in VoIP communication. This is for communication through networks where data is transmitted in packet form. The invention is now described in more detail.

Figure 1A:
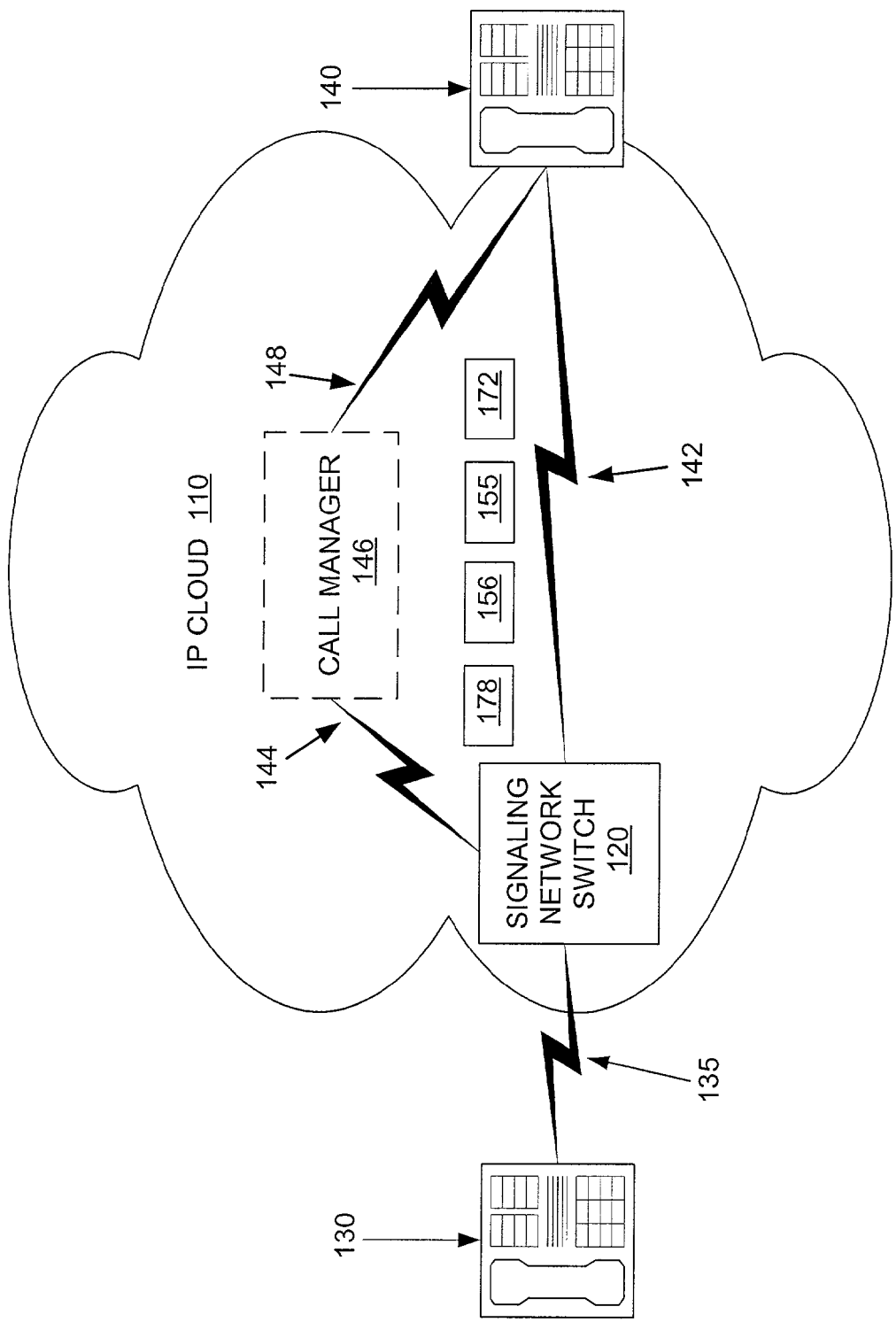
FIG. 1A–FIG. 1D are diagrams of sample arrangements of a signaling network switch and a signaling network call manager, alone and in combination, transmitting warning signals to a telephone that may be made according to an embodiment of the invention.

Referring now to FIG. 1A, aspects of the invention are described in a broad overview form. The invention relates to network telephony, where data is transmitted through a network, such as through a network 110. Network 110 may be an Internet Protocol (IP) network 110, also known as IP Cloud 110, such as the internet or a private network.

A signaling network switch 120 made according to an embodiment of the invention may be placed in IP Cloud 110 as a node. Device 120 may be a gateway, voice gateway, bridge, conference bridge, a router, or other network switch.

A telephone 130 may use switch 120 to dial an IP telephone 140. Telephone 140 may or may not be made according to the invention.

Telephone 130 uses switch 120 by calling it. This means establishing a telephone connection 135 with it, through the Public Switched Telephone Network (PSTN).

In turn, switch 120 establishes a communication link 142 through IP Cloud 110 with telephone 140. Link 142 is called a communication connection, because voice data will be transmitted through it.

In some embodiments, link 142 may be established directly with telephone 140, without the intervention of other devices, such as call managers. For example, certain classes of phones (in the place of telephone 140) may establish contact directly with switch 120. Such phones include those powered by SIP (Session Initiation Protocol). SIP is a cutting-edge Internet protocol that enables web developers to create advanced telephony and multimedia applications, using familiar Internet protocols and web tools.

In other embodiments, link 142 may be established as follows. Switch 120 first establishes a link 144 through IP Cloud 110 with a network call manager device 146. Manager 146 is shown in dashed lines in FIG. 1A, because it need not be made according to the invention, for the benefit of the invention to be realized in this embodiment. Link 144 is called a network call manager connection, because it does not transmit voice data. Then manager 146 establishes a second network call manager connection 148 with device 140. Then manager 146 assists switch 120 to establish communication connection 142 with telephone 140, and maintain it.

An overall connection may thus be established between phones 130, 140. The overall connection is via the combined communication links 135 and 142. The users of phones 130, 140 may speak to each other. Their voices are carried as data packets 155, 156 through network 110.

Importantly, switch 120 analyzes the encoded audio that is contained in data packets 155, 156. Preferably this is performed by looking ahead in the stream, before time comes to transmit.

If switch 120 detects that a periodic tone is included in the audio, switch 120 sends a warning signal. The periodicity may be a single periodicity, or a double periodicity, such as that of a DTMF (Dual Tone Multi Frequency) signal.

The warning signal may be transmitted with the transmitted voice data packets 155, 156. The warning signal may be out of band, with respect to the voice data, such as a named signaling event (NSE). Or it may be an in-band signal.

In another embodiment, the warning signal may be encoded in a warning packet 172. In one more embodiment, when switch 120 detects the end of the periodic tone, it also sends a clear signal CS. Signal CS may be transmitted by means of a clear packet 178.

Switch 120 sends the warning packet ahead of at least some of the voice packets 155, 156 that contain the encoded periodic tone. This way receiving telephone 140, if made according to the invention, will have the opportunity to turn off the adaptation of its acoustic echo canceller.

Switch 120 is the preferred device for performing the analysis of the audio, to determine whether a periodic tone is included. That is because switch 120 is encoding the audio in the first place, and is resource rich.

Switch 120 is preferably by designation the entry point in the network. Since there is only one, such a designation will prevent duplication of warning signals. In addition, it will ensure that generation of the warning signal takes place at the same device where encoding occurs, for ensuring the advantage mentioned above. In other, equivalent embodiments, switch 120 is a convenient point of access of IP telephone 140.

Figure 1B:
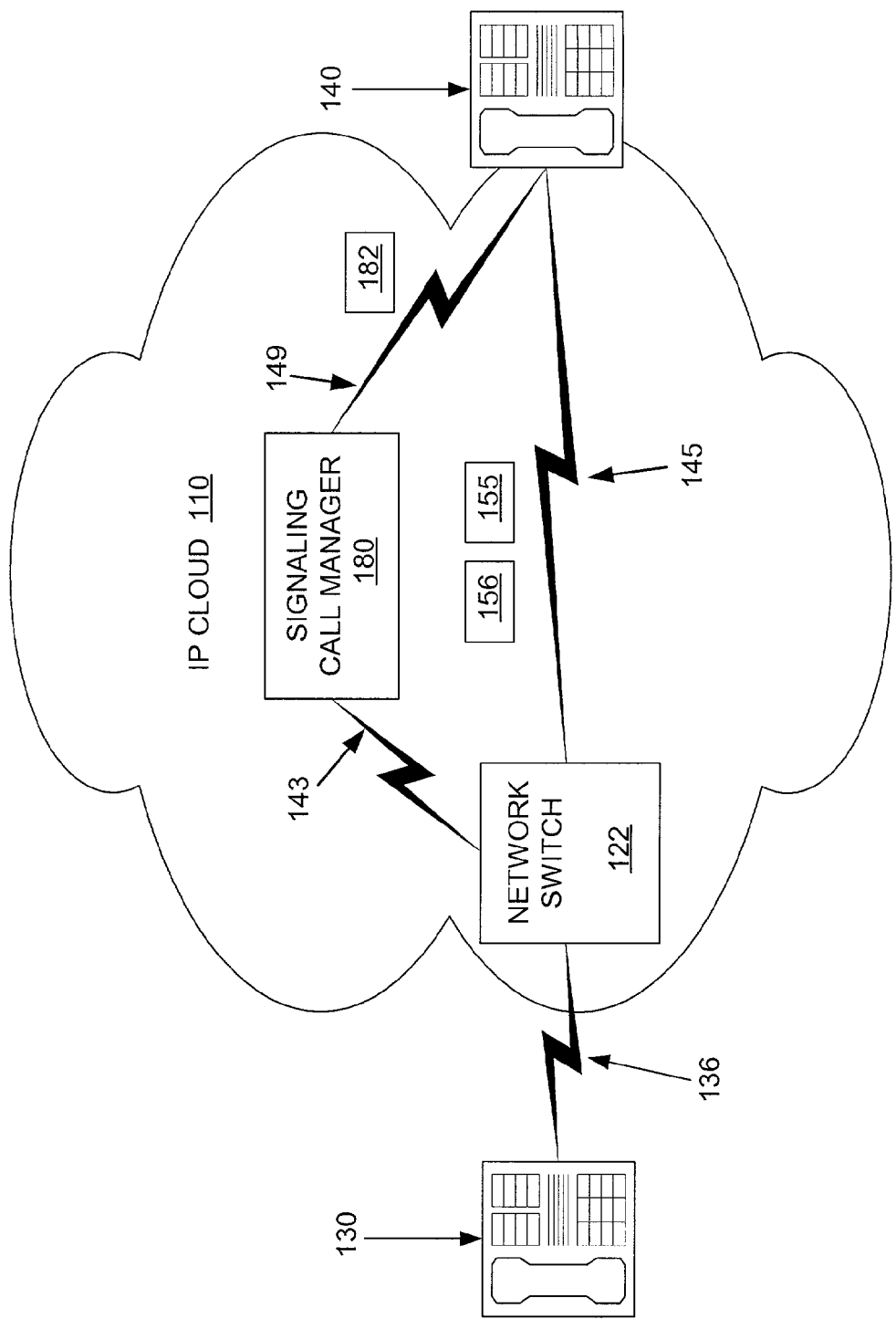

Referring now to FIG. 1B, a signaling call manager device 180 made according the invention is used. In the embodiment of FIG. 1B, a network gateway 122 is used, that need not be made according to the invention.

Telephone 130 may establish a connection 136 with gateway 122 through the PSTN. In turn, gateway 122 establishes a communication connection 145 through IP Cloud 110 with device 140.

Link 143 may be established as follows. Gateway 122 first establishes a network call manager connection 143 through IP Cloud 110 with network call manager device 180. Then manager 180 establishes a second network call manager connection 149 with device 140. Then manager 180 assists gateway 122 establishing communication connection 145 with telephone 140, and maintain it.

An overall connection may thus be established between phones 130 and 140. The overall connection is via the combined communication links 136 and 145. The users of phones 130, 140 may speak to each other. Their voices are carried as data packets 155, 156 through network 110.

Importantly, while manager 180 is setting up the call, and also thereafter, it generates tones or tone generation commands. Some of these tones are periodic, and some with double periodicity.

Manager 180 also generates and sends a warning signal, to be received at least by telephone 140. The warning signal is encoded in a warning packet 182. When received, telephone 140 is thus given the option of turning off its acoustic echo canceller.

In the embodiment of FIG. 1B, warning packet 182 is transmitted through link 149. Equivalently, warning packet 182 may be transmitted first through link 143, and then through link 145, as is seen below.

In the preferred embodiment, manager 180 also encodes a time duration of the periodic signal along with the warning signal.

Figure 1C:
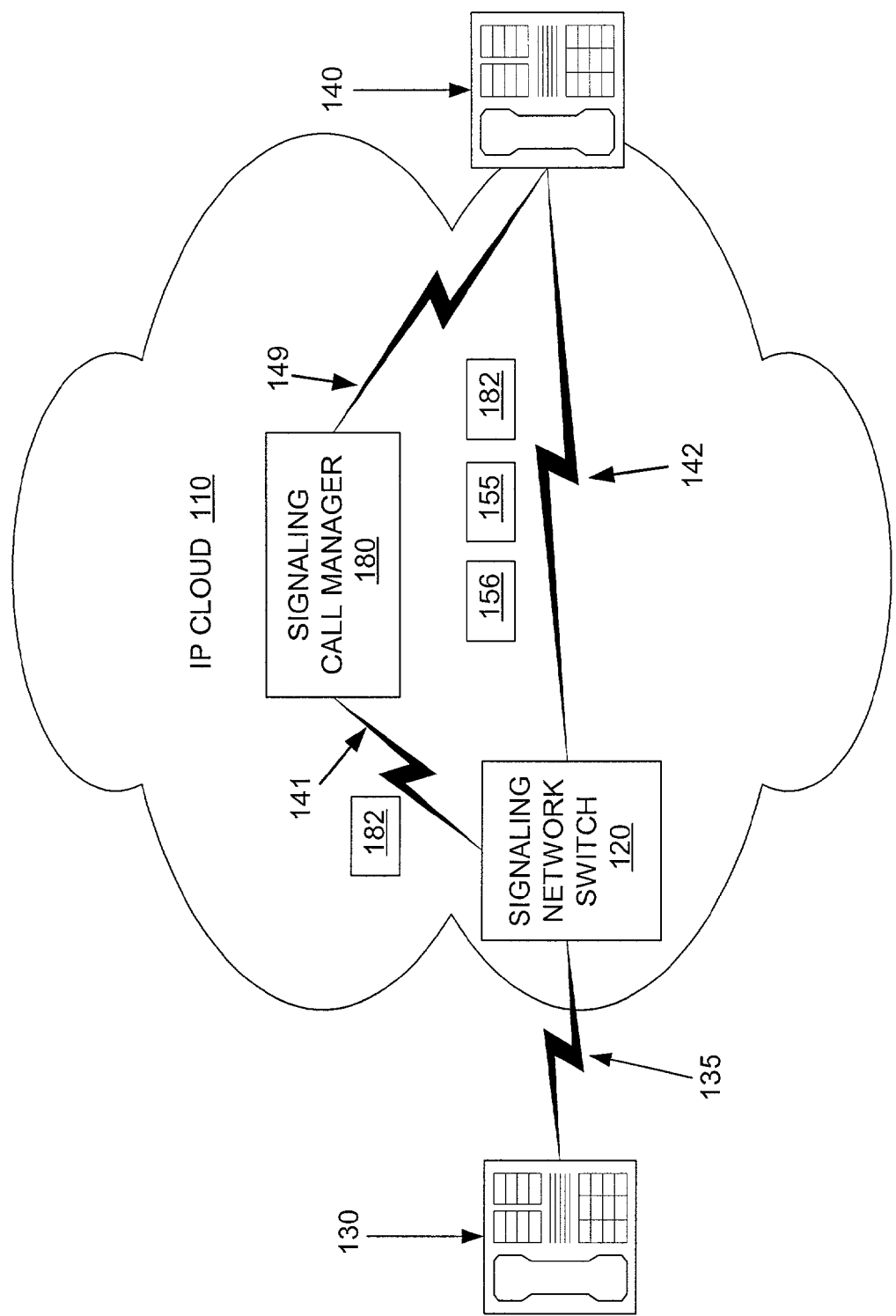

Referring now to FIG. 1C, one more arrangement according to the invention is shown. Both a signaling network switch 120 and a signaling call manager 180 are used. Between them they establish a link 141. Then either one may generate a warning signal for device 140.

In the embodiment of FIG. 1C, manager 180 generates a warning packet 182, and transmits it to switch 120. In turn, switch 120 retransmits it to telephone 140.

Figure 1D:
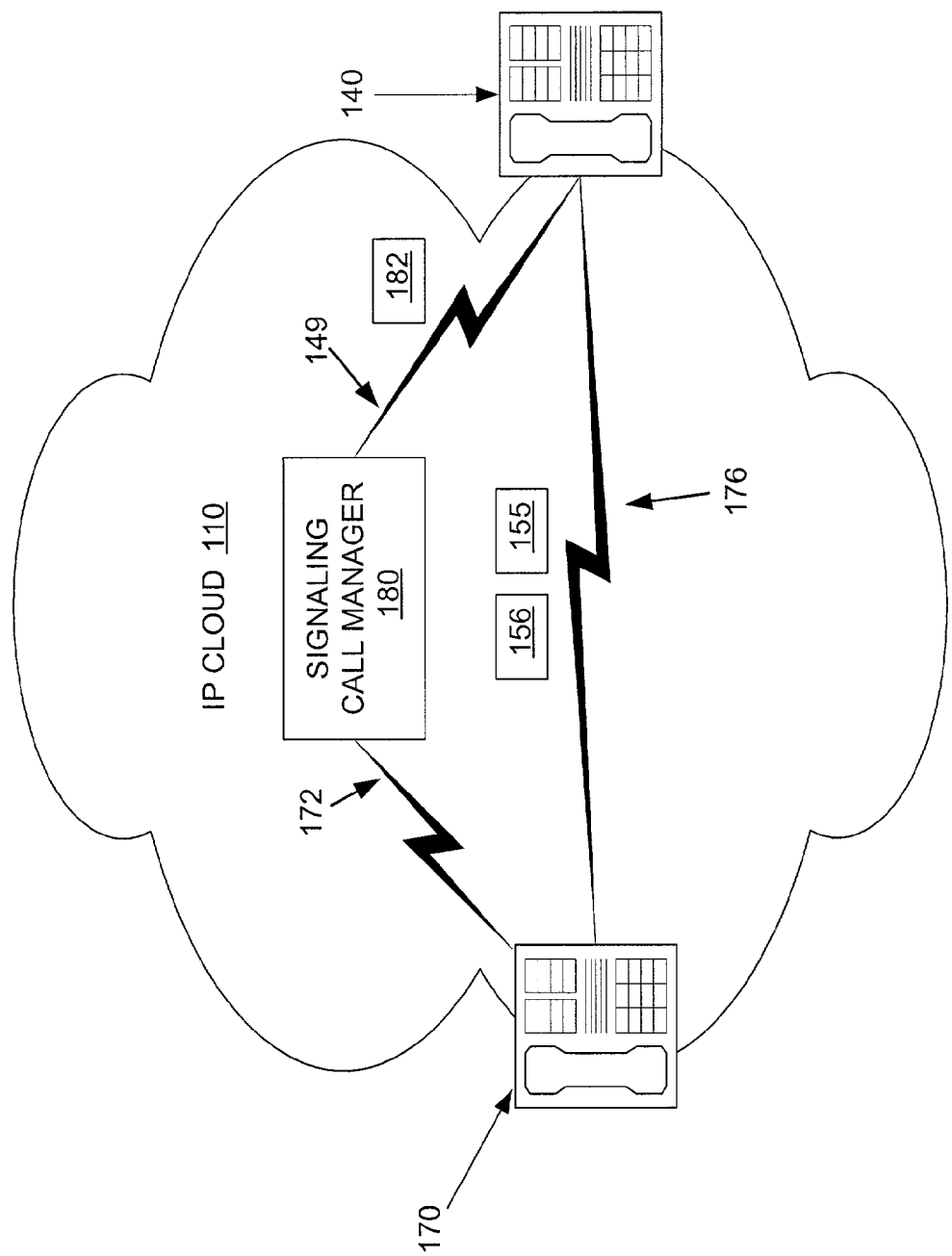

Referring now to FIG. 1D, yet another arrangement according to the invention is shown. An IP telephone 170 dials IP telephone 140, establishing a communication connection 176 between them. Link 176 is established by first establishing a network call manager link 172 with signaling call manager 180 made according to the invention. Then manager 180 may send its warning packet 182 when a periodic tone will be sent.

Figure 2:
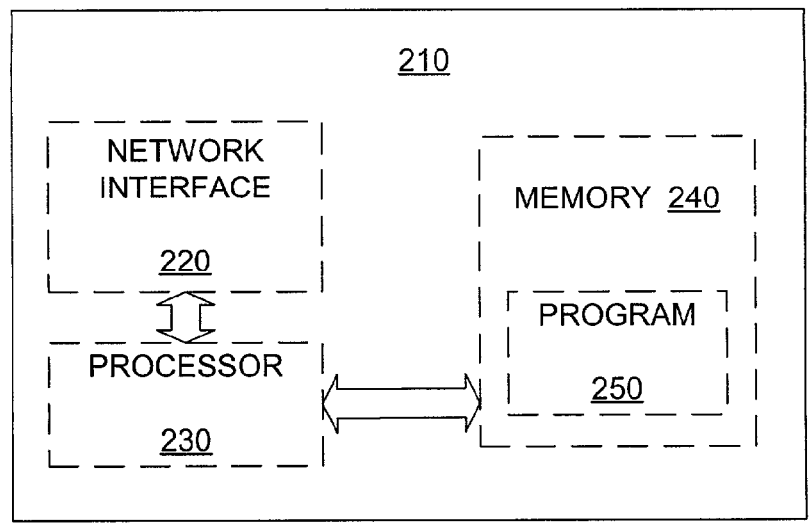
FIG. 2 is a block diagram of components of a signaling network device made according to an embodiment of the invention.

Referring now to FIG. 2, a device 210 made according to an embodiment of the invention is described in more detail. The information given here for device 210 may be used for constructing either signaling network switch 120, or signaling call manager 180 according to the invention.

Device 210 has a network interface 220 for interfacing with a network, such as network 110. Interfacing is by establishing links for communication with other devices in the network.

Device 210 also has a processor 230 coupled with network interface 220. Processor 230 may be implemented as a digital signal processor, Central Processing Unit (CPU), or any other equivalent way known in the art. Device 210 additionally includes a memory 240, on which a program 250 may reside. Functions of processor 230 may be controlled by program 250, as will become apparent from the below.

Figure 3:
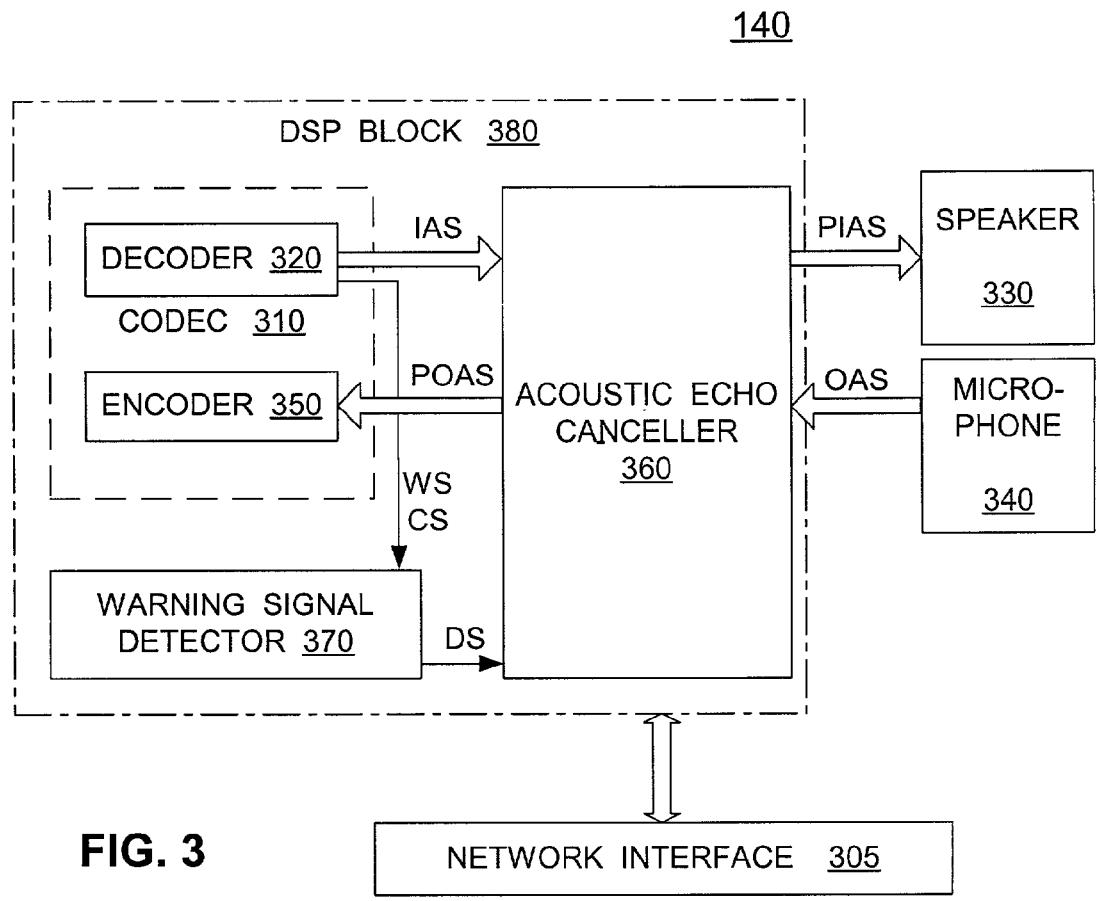
FIG. 3 is a block diagram of components of a telephone made according to an embodiment of the invention.

Referring now to FIG. 3, an IP telephone 140 made according to an embodiment of the invention is described in more detail.

IP telephone 140 includes a network interface 305 for interfacing with a network, such as network 110. Interfacing is by establishing links for communication with other devices in the network.

IP telephone 140 includes a codec 310. Codec 310 includes a decoder 320. Decoder 320 is for decoding data packets incoming from network interface 305. In response, decoder 320 outputs an incoming audio signal IAS. Signal IAS represents decoded sound that was previously encoded in packets 155, 156.

IP telephone 140 also includes a speaker 330. Speaker 330 plays out a processed incoming audio signal PIAS for the user of IP telephone 130. In other words, speaker 330 receives a processed incoming audio signal PIAS, and plays out the represented sound.

IP telephone 140 additionally includes a microphone 340. Microphone 340 is for converting sound into an outgoing audio signal OAS. That is provided for the voice of the user of IP telephone 140.

Codec 310 also includes an encoder 350. Encoder 350 is for encoding the processed outgoing audio signal POAS in data packets (not shown in FIG. 3). These encoded data packets may then be transmitted to network interface 305.

IP telephone 140 further includes an acoustic echo canceller 360. Canceller 360 is for canceling sound that was generated by Incoming Audio Signal IAS. More particularly, an aspect of outgoing audio signal OAS is generated from converting sound played out by speaker 330. Canceller 360 is adapted for adapting to that aspect, so as to better cancel it. Signal PIAS is a result of canceller 360 process, such as attenuation, of signal IAS. Signal POAS is a result of canceller 360 process, which may be filtering and may be attenuation. Encoder 350 therefore generally does not retransmit back to the network any sounds that came from the network.

IP telephone 140 also includes a warning signal detector 370, which is also known simply as detector 370. Detector 370 is adapted to detect a warning signal WS from the incoming data packets, which was generated from the cooperating signaling network switch 120. Detector 370 is adapted to generate a Disable signal DS in response to warning signal WS.

Importantly according to the invention, acoustic echo canceller 360 discontinues adapting responsive to disable signal DS. This will prevent canceller 360 from adapting to a periodic signal.

In one embodiment of the invention, detector 370 is adapted to detect a clear signal CS from the data packets. Detector 370 may discontinue disable signal DS responsive to clear signal CS, and thus re-enable canceller 360 to resume adapting.

In another embodiment of the invention, detector 370 is adapted to determine a time duration encoded in the warning signal WS. Encoding may be either explicit or as a protocol. That is a time duration of the periodic sound in the audio. Detector 370 is further adapted to discontinue disable signal DS after the time duration. Again, this will re-enable canceller 360 to resume adapting.

Most cancellers attenuate adversely the signal they process. An advantage of the invention is that, when canceller 360 discontinues adapting, it also discontinues the adverse attenuation.

It is readily apparent that the present invention may be implemented by one or more devices that include logic circuitry. It may also be implemented by a device that includes a dedicated processor system, which may include a microcontroller or a microprocessor. For example, codec 310, canceller 360 and detector 370 may be implemented in a Digital Signal Processing (DSP) block 380.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general-purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 4:
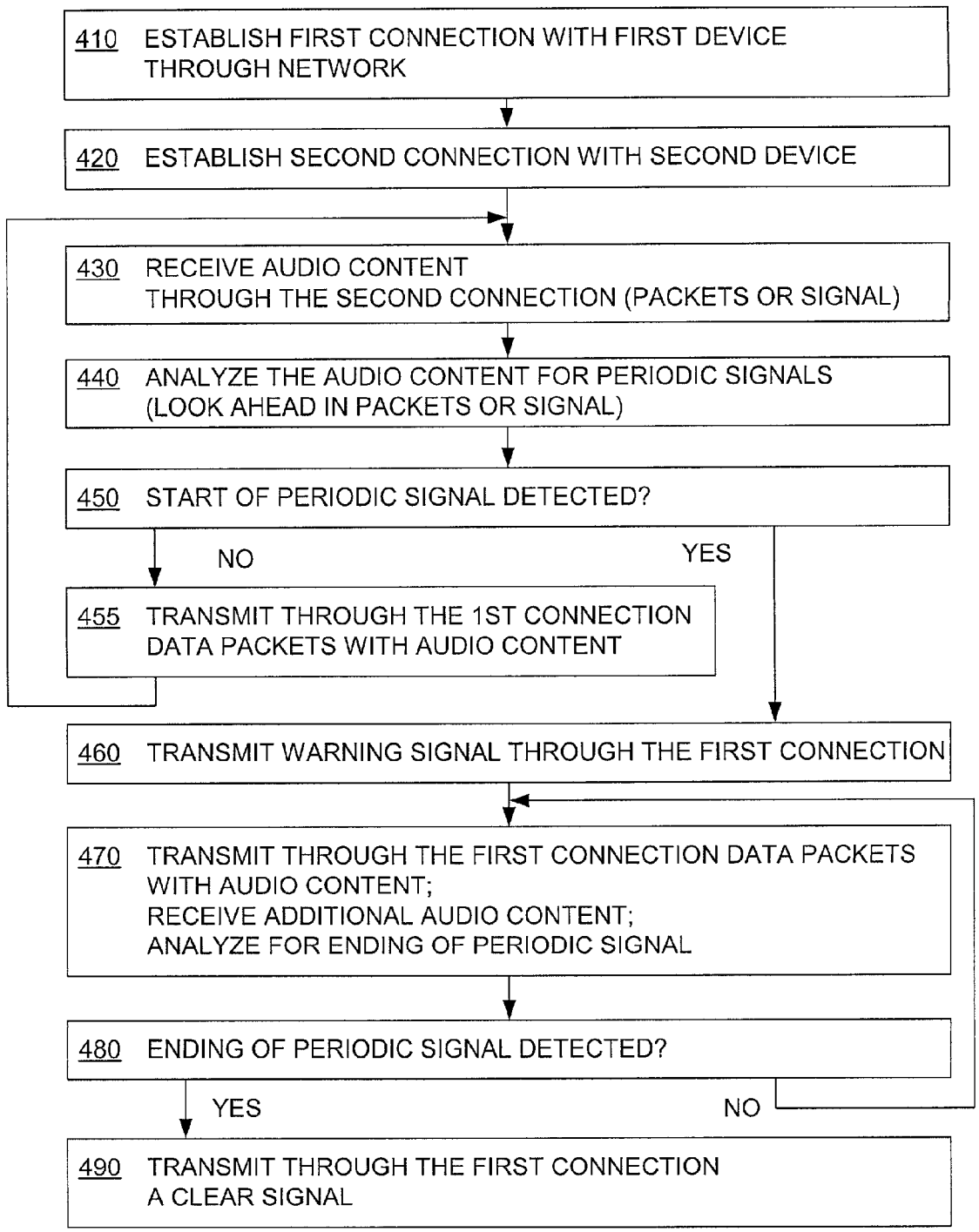
FIG. 4 is a flowchart illustrating a method according to an embodiment of the present invention, which may be performed by a signaling network switch.

Referring now to FIG. 4, a flowchart 400 is used to illustrate a method according to an embodiment of the invention. The method of flowchart 400 may be performed by a signaling network switch.

According to a box 410, a first connection is established through a network. The first connection is with a first device, such as connection 142 with IP telephone 140 in FIG. 1A.

According to a next box 420, a second connection is established with a second device, such as connection 135 with telephone 130.

According to a next box 430, audio content is received through the second connection. This is either in the form of a signal, or in the form of encoded audio, carried in data packets.

According to a next box 440, the audio content is analyzed for periodic signals. This is preferably implemented by looking ahead, such as in the stream of data packets.

According to a next box 450, it is inquired whether the start of a periodic signal is detected as a result of the analysis.

If not, then according to a next box 455, data packets are transmitted through the first connection, which include the received audio in encoded form. Execution then returns to box 430.

If yes, then according to a next box 460, a warning signal is transmitted through the first connection. It may be included in a warning packet, or be merged with the audio content.

According to a next box 470, data packets are transmitted through the first connection, which include the received audio in encoded form. Then additional audio content is received, and analyzed for an ending of the periodic signal.

According to a next box 480, it is inquired whether an ending of the periodic signal is detected. If not, then execution returns to box 470.

If yes, then according to a next box 490, a clear signal is transmitted through the first connection. It may be transmitted as a clear packet.

Referring now to FIG. 5, a flowchart 500 is used to illustrate a method according to an embodiment of the invention. The method of flowchart 500 may be performed by a network call manager device, assisting two devices establish a VoIP communication connection in a packet switched network.

According to a box 510, a first network call manager connection is established through the network. The first connection is with a first device.

According to a next box 520, a second network call manager connection is established with a second device.

According to a next box 530, the first device and the second device are assisted in having a communication connection through the network.

According to a next box 540, a first periodic signal is generated, or an instruction is generated for a second periodic signal to be generated by one of the first and second devices. In the first case, the first periodic signal is generated by the call manager. In the second case, the instruction is for the first or the second device to generate a second periodic signal. In either case, the first or the second periodic signal may have double periodicity. It may be part of the call setup, or a call waiting tone for one of the parties, etc. Although generated, the first periodic signal or the second periodic signal is preferably not sent yet. The following description proceeds equally for either one of the two signals.

According to a next box 570, a time duration of the periodic signal is encoded in a warning signal. In the preferred embodiment, this takes place as follows. According to a box 550, the type of the periodic signal is identified. It might be one of some of the known types of periodic signals. According to a subsequent box 560, the periodic signal duration is determined from the identified type. This may be performed by looking up a table of the known types of periodic signals.

According to a next box 580, the warning signal is transmitted through one of the first and second network call manager connections.

According to a next box 590, the first periodic signal is transmitted through one of the first and second network call manager connections. In the situation where, in box 540, an instruction was generated for generating a second periodic signal, then it is the instruction that is transmitted.

Figure 6:
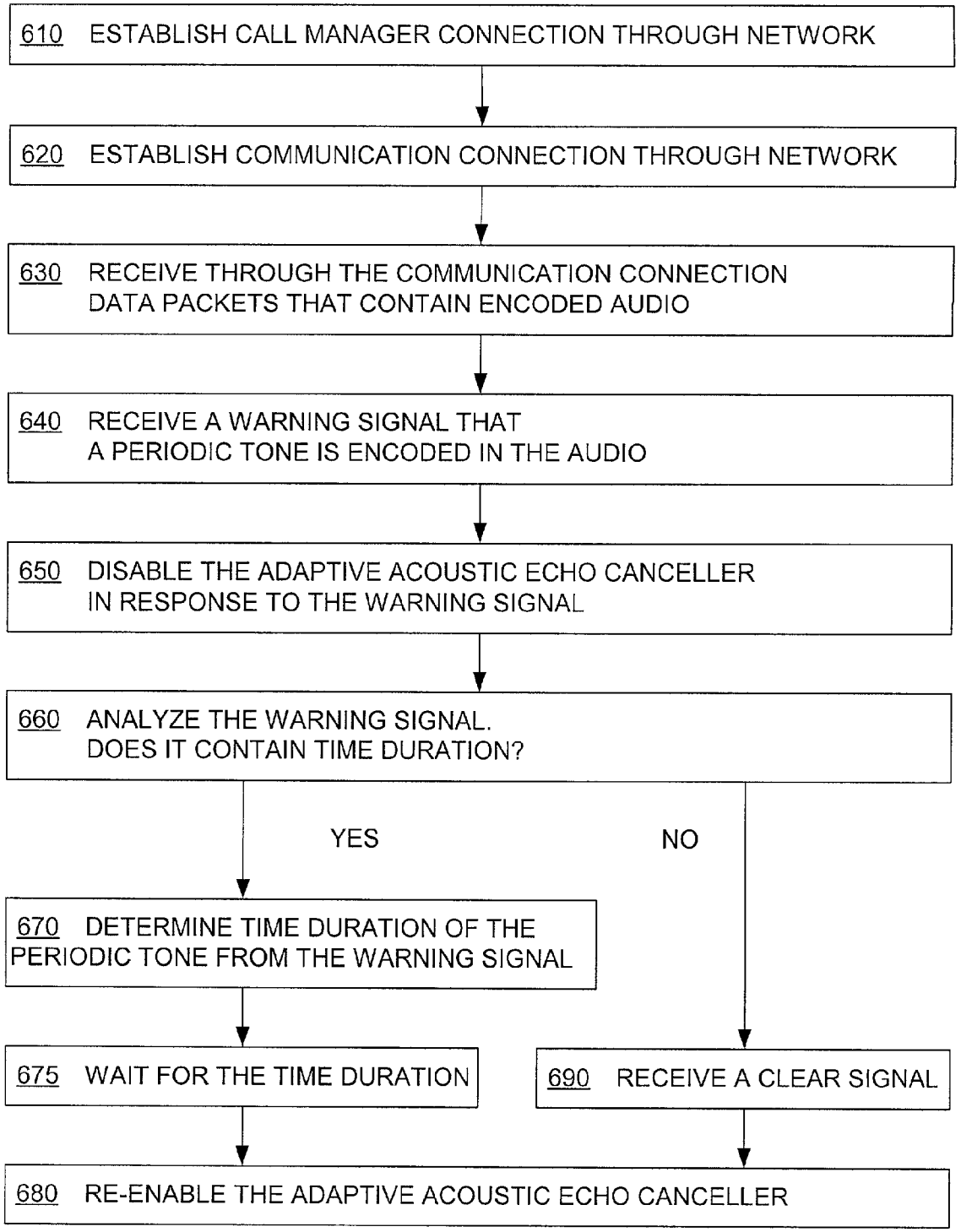
FIG. 6 is a flowchart illustrating a method according to an embodiment of the present invention, which may be performed by a telephone that is adapted to receive a warning signal from either a signaling network switch performing the method of FIG. 4, or a call manager performing the method of FIG. 5, or both.

Referring now to FIG. 6, a flowchart 600 is used to illustrate a method according to another embodiment of the invention. The method of flowchart 600 may be performed by a telephone, especially one cooperating with either a signaling network switch implementing the method of flowchart 400, or a signaling call manager implementing the method of flowchart 500.

According to an optional box 610, a call manager connection is established with a call manager device in a network. The call manager connection may be connection 144, established with device 120 in network 110 of FIG. 1A or connection 143 of FIG. 1B.

According to a next box 620, a communication connection is established with a device in a network. The communication connection may be connection 142 of FIG. 11A or connection 145 of FIG. 1B.

According to a next box 630, data packets are received through the communication connection. The data packets contain encoded audio.

According to a next box 640, a warning signal is received. The warning signal warns that a periodic tone is encoded in the audio. The warning signal may be received either through the call manager connection, or through the communication connection, as the case may be.

According to a next box 650, the adaptive acoustic echo canceller is disabled in response to the warning signal. If performed in hardware, this might be by issuing a disable signal. If in software, the disable signal may be by setting a flag.

According to an optional next box 660, it is determined whether the warning signal contains a time duration.

If yes, then according to a next box 670, a time duration of the periodic tone or periodic signal is determined. According to a next box 675, the device waits for the time duration that was determined above. According to a next box 680, the adaptive acoustic echo canceller is re-enabled in response to the clear signal.

Re-enabling according to box 680 may be performed by performing the inverse of box 650. For example, if a disable signal has been issued, it may be recalled. If a disable flag has been set, it may be reset.

If, on the other hand, at box 660 it is determined that the warning signal does not contain a duration, then the device waits until, according to a next box 690, a clear signal is received through the first telephone connection. Execution then continues with box 680.

While the present description is given in a context of a two party call, such is only by example, and not by limitation. Indeed, the devices, softwares and methods of the invention may also be used in scenaria where more parties participate, such as conference calling.

In addition, while the present description is given in a context of a voice call, such is only by example, and not by limitation. Indeed, the devices, softwares and methods of the invention may also be used in scenaria of video calls that have a sound component.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways.

The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and sub-combinations of features, functions, elements and/or properties may be presented in this or a related document.

The invention claimed is:

1. A signaling network processing device comprising:
a network interface for coupling to a network; and
a processor coupled with the network interface, wherein the processor is adapted to:
establish a call manager connection with a call manager;
exchange signaling messages over the call manager connection to establish a communicative connection with an endpoint other than the call manager, the signaling messages not including any voice data;
analyze the received audio content to identify a portion having a periodic signal;
generate a warning packet to signal the endpoint to turn off acoustic echo canceller adaptation;
generate a clear packet to signal the endpoint to turn on acoustic echo canceller adaptation;
transmit a representation of the received audio content; and
transmit the warning packet and the clear packet directly to the endpoint separately and independently from the representation of received the audio content.

2. The signaling network processing device of claim 1, wherein analyzing the received audio content is performed by looking ahead.

3. The signaling network processing device of claim 1, wherein the periodic signal has a double periodicity.

4. The signaling network processing device of claim 1, wherein the warning signal is in-band.

5. The signaling network processing device of claim 1, wherein the warning signal is out of band.

6. The signaling network processing device of claim 5, wherein the warning signal is a named signaling event.

7. The signaling network processing device of claim 1, the processor is further adapted to:
determine a duration of the periodic signal; and
encode the duration in the warning packet.

8. A signaling network call manager comprising:
a network interface for coupling to a network; and
a processor coupled with the network interface, wherein the processor is adapted to
establish a first network call manager connection with a network device, the first network call manager connection being an out of band connection;
establish a second network call manager connection with a telephone endpoint including an IP telephone with an acoustic echo canceller, the second call manager connection being an out of band connection;
exchange signaling over the first and second network call manager connections to establish a communicative connection through a packet switched network to the telephone endpoint, the communicative connection being an in band connection and used by the network device to transmit voice data to the telephone endpoint;
generate one of a first periodic signal and an instruction for a second periodic signal to be played by the telephone endpoint;
encode a time duration of one of the first periodic signal and the second periodic signal in a warning signal;
transmit the warning signal in at least one packet through the second network call manager connection to be received by the IP telephone to control the acoustic echo canceller; and
transmit the generated one of the first periodic signal and the instruction through the second network call manager connection;
wherein the voice data is not transmitted through either the first or second network call manager connection.

9. The signaling network call manager of claim 8, wherein one of the first and second periodic signals has a double periodicity.

10. The signaling network call manager of claim 8, the processor is further adapted to:
- identify a type of one of the first periodic signal and the second periodic signal; and
- determine the time duration from the identified type.

11. A device comprising:
- means for establishing a signaling path with a call manager;
- means for exchanging communications over the signaling path with the call manager to establish a communicative connection through a packet switched network to an endpoint, the endpoint being physically separate from the call manager;
- means for identifying a periodic signal included in received audio content;
- means for identifying a duration of the periodic signal;
- means for generating a warning packet that encodes the duration of the periodic signal; and
- means for transmitting the warning packet to the endpoint to control an echo canceller.

12. The device of claim 11, wherein the means for identifying the periodic signal is performed by looking ahead.

13. The device of claim 11, wherein the periodic signal has a double periodicity.

14. The device of claim 11, wherein the warning packet is transmitted in-band.

15. The device of claim 11, wherein the warning packet is transmitted out of band.

16. The device of claim 15, wherein the warning signal is a named signaling event.

17. The device of claim 11, further comprising:
- means for determining an ending of the periodic signal; and
- means for transmitting a clear signal corresponding to the ending.

18. A device comprising:
- means for establishing a first network call manager connection with a gateway that couples a non packet switched network to a packet switched network;
- means for establishing a second network call manager connection with a telephone endpoint;
- means for exchanging communications over the first and second network call manager connections to assist a gateway in establishing a call through the packet switched network to the telephone endpoint;
- means for generating one of a first periodic signal and an instruction for a second periodic signal to be played by the telephone endpoint;
- means for encoding a time duration of one of the first periodic signal and the second periodic signal in a warning signal;
- means for transmitting the warning signal in at least one packet through the second network call manager connection to be received by the telephone endpoint to control an echo canceller; and
- means for transmitting the generated one of the first periodic signal and the instruction through the second network call manager connection to be received by the telephone endpoint.

19. The device of claim 18, wherein one of the first and second periodic signals has a double periodicity.

20. The device of claim 18, further comprising:
- means for identifying a type of one of the first periodic signal and the second periodic signal; and
- means for determining the time duration from the identified type.

21. An article comprising:
- a storage medium, said storage medium having stored thereon instructions, that, when executed by at least one device, result in:
- exchanging signaling messages over a call manager connection to establish a communicative connection with an endpoint;
- analyzing received audio content to determine whether the received audio content includes a periodic signal;
- transmitting to the endpoint through the communicative connection data packets representing the received audio content; and
- transmitting to the endpoint through the communicative connection a warning packet and a clear packet to respectively signal a beginning and an end of the periodic signal included in the data packets and to control an echo canceller;
- wherein the warning and clear packets are transmitted from the at least one device to the endpoint independently of the data packets representing the received audio content.

22. The article of claim 21, wherein analyzing the received audio content is performed by looking ahead.

23. The article of claim 21, wherein the instructions further result in:
- determining a duration of the periodic signal; and
- encoding the duration in the warning packet.

24. An article comprising:
- a storage medium, said storage medium having stored thereon instructions, that, when executed by at least one device, result in:
- establishing a first network call manager connection with a network device;
- establishing a second network call manager connection with a telephone endpoint including an IP telephone with an acoustic echo canceller;
- exchanging communications over the second network call manager connection to cause a communicative connection to be established from the network device through a packet switched network to the telephone endpoint;
- generating one of a first periodic signal and an instruction for a second periodic signal to be played by the telephone endpoint;
- encoding a time duration of one of the first periodic signal and the second periodic signal in a warning signal;
- transmit the warning signal in at least one packet through the second network call manager connection to be received by the IP telephone to control the acoustic echo canceller; and
- transmitting the generated one of the first periodic signal and the instruction through the second network call manager connection.

25. The article of claim 24, wherein one of the first and second periodic signals has a double periodicity.

26. The article of claim 24, wherein the instructions further result in:
- identifying a type of one of the first periodic signal and the second periodic signal; and
- determining the time duration from the identified type.

27. A method of operating a gateway that separates a packet switched network and a circuit switched network, said method comprising:
- exchanging signaling over the packet switched network and between the gateway and a call manager to establish a connection with an endpoint through the packet switched network;

receiving audio content from the circuit switched network;

transmitting to the endpoint through the connection data packets that contain an encoded form of the received audio content;

analyzing the audio content for a periodic signal; and transmitting a warning signal through the connection over the packet switched network when a periodic signal is identified, the warning signal controlling an echo canceller;

wherein the data packets and the warning signal are addressed independently of an address for the call manager.

28. The method of claim 27, wherein analyzing the audio content is performed by looking ahead.

29. The method of claim 27, wherein the periodic signal has a double periodicity.

30. The method of claim 27, wherein the warning signal is in-band.

31. The method of claim 27, wherein the warning signal is out of band.

32. The method of claim 31, wherein the warning signal is a named signaling event.

33. The method of claim 27, further comprising:

determining an ending of the periodic signal; and transmitting a clear signal corresponding to the ending.

34. The method of claim 27, further comprising:

determining a duration of the periodic signal; and encoding the duration in the warning signal.

35. A method comprising:

establishing a first network call manager connection that does not transmit voice data with a network device;

establishing a second network call manager connection that does not transmit voice data with an endpoint;

exchanging Session Initiation Protocol (SIP) signaling messages over the first and second call manager connections to assist the network device in establishing a communication connection with the endpoint through a packet switched network;

generating one of a first periodic signal and an instruction for a second periodic signal to be played by an IP telephone associated with the endpoint;

encoding a time duration of one of the first periodic signal and the second periodic signal in a warning signal;

transmitting the warning signal in at least one packet through the second call manager connection to be received by the IP telephone to control an acoustic echo canceller; and transmitting the generated one of the first periodic signal and the instruction through the second call manager connection.

36. The method of claim 35, wherein one of the first and second periodic signals has a double periodicity.

37. The method of claim 35, further comprising:

identifying a type of one of the first periodic signal and the second periodic signal; and determining the time duration from the identified type.

38. The signaling network processing device of claim 1 wherein the endpoint receives the representation of the audio content and the packets separately and independently.

* * * * *